(12) United States Patent
Chiba

(10) Patent No.: US 8,589,606 B2
(45) Date of Patent: Nov. 19, 2013

(54) PHYSICAL LAYER CIRCUIT

(75) Inventor: Katsuharu Chiba, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 486 days.

(21) Appl. No.: 13/024,846

(22) Filed: Feb. 10, 2011

(65) Prior Publication Data

US 2011/0194652 A1 Aug. 11, 2011

(30) Foreign Application Priority Data

Feb. 10, 2010 (JP) .................................. 2010-027724

(51) Int. Cl.
*G06F 7/74* (2006.01)
(52) U.S. Cl.
USPC .............................................. 710/71; 710/16
(58) Field of Classification Search
None
See application file for complete search history.

(56) References Cited

U.S. PATENT DOCUMENTS

| | | | |
|---|---|---|---|
| 6,400,616 B1 * | 6/2002 | Tamura et al. ................. | 365/198 |
| 7,199,620 B2 | 4/2007 | Ishizuka et al. | |
| 7,253,754 B2 * | 8/2007 | Takeuchi et al. .............. | 341/100 |
| 2006/0033535 A1 | 2/2006 | Ishizuka et al. | |

FOREIGN PATENT DOCUMENTS

JP 2006-054742 2/2006

OTHER PUBLICATIONS

"Information technology—At Attachment with Packet Interference-7 vol. 3—Series Transport Protocols and Physical Interconnect (ATA/ATAPI-7 V3)" Revision 4b Apr. 21, 2005, Internet <http://www.t13.org/Documents/UploadedDocuments/docs2007/D11532v3r4b-AT_Attachment_with_Packet_Interface_-_7_Volume_3pdf>, p. 59, Figure 29.

* cited by examiner

*Primary Examiner* — Cheng-Yuan Tseng
(74) *Attorney, Agent, or Firm* — Young & Thompson

(57) ABSTRACT

Provided is a physical layer circuit. Upon detecting a connection recognition signal from an output of a differential input terminal, a first detection circuit outputs a first control signal for allowing an upper layer to output a power supply control signal for turning on a power supply of each of a receiver circuit and a recovery conversion circuit. Upon detecting "input absent" based on the bit configuration of parallel data, a second detection circuit outputs a second control signal for allowing the upper layer to output the power supply control signal for turning off the power supply of each of the receiver circuit and the recovery conversion circuit. A control circuit turns off a power supply of the first detection circuit when the second detection circuit detects "input present", and turns on the power supply of the first detection circuit when the second detection circuit detects "input absent".

20 Claims, 12 Drawing Sheets

PHYSICAL LAYER CIRCUIT

INCORPORATION BY REFERENCE

This application is based upon and claims the benefit of priority from Japanese patent application No. 2010-27724, filed on Feb. 10, 2010, the disclosure of which is incorporated herein in its entirety by reference.

BACKGROUND

1. Field of the Invention

The present invention relates to a physical layer circuit of a differential serial communication device.

2. Description of Related Art

While the data transfer rate of a hard disk, a DVD, and the like has been increasing, the transfer rate is reaching a limit in the conventional parallel data transfer method. In this situation, a differential serial data transfer method has become popular (see Japanese Unexamined Patent Application Publication No. 2006-54742, and "Information Technology—At Attachment with Packet Interface-7 Volume 3—Serial Transport Protocols and Physical Interconnect (ATA/ATAPI-7 V3)" Revision 4b 21 Apr. 2005, Internet <http://www.t13.org/Documents/UploadedDocuments/docs2007/D1532v3r4b-AT_Attachment_with_Packet_Interface_-_7_Volume_3.pdf>, page 59, FIG. 29 (hereinafter referred to as Non-Patent Document 1).

Referring to Non-Patent Document 1, the configuration of a physical layer (PHY) of a receiver of a communication device using the differential serial transfer method (hereinafter referred to as "differential serial communication device") will be described.

In FIG. 11, a part of the functional blocks and signals, which are illustrated in FIG. 29 of Non-Patent Document 1, are denoted by reference symbols for convenience of explanation.

As shown in FIG. 11, the physical layer of the receiver of the differential serial communication device includes a differential input terminal, a receiver circuit 14, a recovery conversion circuit 16 (which is illustrated as "data extraction block" in FIG. 11), and a detection circuit 20 (which is illustrated as "OOB signal detector" in FIG. 11). The differential input terminal is composed of a positive polarity terminal 11 and a negative polarity terminal 12.

Each of the positive polarity terminal 11 and the negative polarity terminal 12 is connected to a serial cable, receives a differential serial signal transmitted from a communication counterpart, and outputs the differential serial signal to each of the receiver circuit 14 and the detection circuit 20. Hereinafter, inputs from the positive polarity terminal 11 and the negative polarity terminal 12 are referred to as "positive polarity input S01" and "negative polarity input S02", respectively.

The receiver circuit 14 is an analog differential comparator circuit that converts an input from the differential input terminal into a single serial data item and outputs the serial data to the recovery conversion circuit 16. Specifically, when the differential input terminal receives no differential serial signal, i.e., when the positive polarity input S01 and the negative polarity input S02 are at the same potential, the receiver circuit 14 outputs a low level signal as serial data S1. Meanwhile, when the differential input terminal receives a differential serial signal, the receiver circuit 14 outputs a high level signal or a low level signal that corresponds to the level of the positive polarity input S01, as the serial data S1.

The recovery conversion circuit 16 obtains a received recovered clock (which is illustrated as "recovered clock" in FIG. 11; hereinafter referred to as "recovered clock CLK") by separating a clock signal from the serial data S1, and converts a single serial data item S1 into a predetermined number (bit width) of parallel data P.

The positive polarity input S01 and the negative polarity input S02 are also input to the detection circuit 20. The detection circuit 20 includes an analog differential comparator circuit. The differential comparator circuit compares the amplitudes of the positive polarity input S01 and the negative polarity input S02 with a predetermined threshold. For instance, as a result of the comparison between the positive polarity input S01 and the negative polarity input S02, the detection circuit 20 generates a detection signal (internal signal D0) as an internal signal of the detection circuit. The high level of the detection signal D0 indicates that the differential serial signal from the communication counterpart is input to the differential input terminal, and the low level of the detection signal indicates that the differential serial signal from the communication counterpart is not input to the differential input terminal. Hereinafter, the state where the differential serial signal is input to the differential input terminal is referred to as "input present state", and the state where the differential serial signal is not input to the differential input terminal is referred to as "input absent state".

Further, the detection circuit 20 generates a first signal D1 and a second signal D2 by using the detection signal D0, and outputs the generated signals to an upper layer. Herein, the first signal D1 is a signal for use in resetting or initialization, and the second signal D2 is a signal indicating restoration from a power-down state to a normal operation state of the system. Upon detecting a data pattern for connection recognition (hereinafter referred to as "connection recognition signal"), which is transmitted by the communication counterpart prior to the start of data transmission, from the positive polarity input S01 and the negative polarity input S02 based on the detection signal D0, the detection circuit 20 outputs the second signal D2 of high level to the upper layer.

SUMMARY

As specifications for the physical layer of the receiver of the differential serial communication device, ON/OFF control of the power supply of each of the receiver circuit 14 and the recovery conversion circuit 16 is not particularly specified. However, the internal signal D0 of the detection circuit 20 and the first signal D1 and the second signal D2 which are output from the detection circuit 20 to the upper layer are used for the ON/OFF control of the power supply of each of the receiver circuit 14 and the recovery conversion circuit 16. Specifically, when the second signal D2 becomes high level, the power supply of each of the receiver circuit 14 and the recovery circuit 16 is turned on. After that, when the detection signal D0 of the internal signal within the detection circuit 20 becomes low level, the power supply of each of the receiver circuit 14 and the recovery conversion circuit 16 is turned off so as to cut noise in the input absent state. In this case, the detection circuit 20 also functions as a squelch circuit.

FIG. 12 is a timing diagram showing an exemplary transition of each signal in the receiver of the physical layer circuit shown in FIG. 11 when the detection circuit 20 also functions as a squelch circuit.

Time T0

The serial cable connected to the differential input terminal is in a disconnected state. This corresponds to the input absent state. In this case, the positive polarity input S01 and the negative polarity input S02 are at the same potential, and the detection signal D0, the second signal D2, the serial data S1, all the bits of the parallel data P, and the recovered clock CLK are at low level. Further, the power supply of each of the receiver circuit 14 and the recovery conversion circuit 16 is turned off.

Time T1

The serial cable is in a connected state, i.e., in the input present state. At this time, the connection recognition signal is input to the differential input terminal, and the input is detected by the detection circuit 20. Thus, the second signal D2 of high level is output to the upper layer. The power supply of each of the receiver circuit 14 and the recovery conversion circuit 16 remains turned off. Accordingly, the serial data S1, all the bits of the parallel data P, and the recovered clock CLK remain at low level.

Time T2

The upper layer receiving the second signal D2 of high level turns on the power supply of each of the receiver circuit 14 and the recovery conversion circuit 16. In response to this, the receiver circuit 14 and the recovery conversion circuit 16 start to operate, and the output of the recovered clock CLK is started. Since a data signal subsequent to the connection recognition signal is not input yet, the serial data S1 and all the bits of the parallel data P are at low level. Further, no connection recognition signal is detected, so that the second signal D2 becomes low level.

Time T3

A normal data signal subsequent to the connection recognition signal is input to the differential input terminal. The data signal is converted into the serial data S1 by the receiver circuit 14, and is further converted into the parallel data P by the recovery conversion circuit 16. The recovered clock CLK synchronous with the parallel data P is also output. After that, the detection signal D0 of high level is continuously output within the detection circuit 30 until a time T4 when the differential input terminal receives no data signal. Since these data signals are not connection recognition signals, the second signal D2 remains at low level.

Time T4

No data signal is input, and the serial cable is disconnected. Thus, the positive polarity inputs S01 and the negative polarity input S02 are at the same potential, and the detection signal D0, the serial data S1, and all the bits of the parallel data P become low level.

Time T5

When the detection signal D0 becomes low level, the upper layer turns off the power supply of each of the receiver circuit 14 and the recovery conversion circuit 16. As a result, no recovered clock CLK is output.

The data transfer using the differential serial data transfer method is also applied to portable devices, such as a laptop personal computer (PC), which is required to reduce the power consumption. It is a major issue to suppress the power consumption of the differential serial communication device. As is obvious from the above description, in the physical layer of the receiver of the differential serial communication device, the receiver circuit 14, which includes an analog comparator, and the detection circuit 20 have a relatively high power consumption. In the input absent state, the power consumption can be suppressed to some extent by turning off the power supply of each of the receiver circuit 14 and the recovery conversion circuit 16. However, a further reduction in power consumption is required.

A first exemplary aspect of the present invention is a physical layer circuit of a differential serial communication device. The physical layer circuit includes a differential input terminal, a conversion unit, a first detection circuit, a second detection circuit, and a control circuit.

The differential input terminal receives a differential serial signal from a communication counterpart, and outputs the received differential serial signal.

The conversion unit is connected to the differential input terminal, and converts an output from the differential input terminal into a predetermined number of bits of parallel data. ON/OFF of a power supply of the conversion unit is controlled by a power supply control signal from an upper layer.

The first detection circuit is connected to the differential input terminal and detects a connection recognition signal indicating a start of communication from the output from the differential input terminal. The first detection circuit outputs a first control signal for allowing the upper layer to output the power supply control signal for turning on the power supply of the conversion unit, upon detecting the connection recognition signal.

The second detection circuit is connected to the conversion unit and detects presence or absence of reception of the differential serial signal at the differential input terminal by detecting whether the predetermined number of bits of the parallel data obtained by the conversion unit has a bit configuration indicative of the presence or absence of the reception of the differential serial signal at the differential input terminal. The second detection circuit outputs a second control signal for allowing the upper layer to output the power supply control signal for turning off the power supply of the conversion unit, upon detecting the absence of the reception.

The control unit turns off a power supply of the first detection circuit when the second detection circuit detects the presence of the reception, and turns on the power supply of the first detection circuit when the second detection circuit detects the absence of the reception.

The implementation of the physical layer circuit according to the above exemplary aspect as any of a method, a device, a system, and the like, and a communication device including the physical layer circuit are also effective as other aspects of the present invention.

According to an exemplary aspect of the present invention, the power consumption of the differential serial communication device can be further suppressed.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Hereinafter, exemplary embodiments of the present invention will be described with reference to the accompanying drawings. For clarity of explanation, the following description and the drawings are omitted or simplified as appropriate, except for the components related to the present invention.

First Exemplary Embodiment

Figure 1:
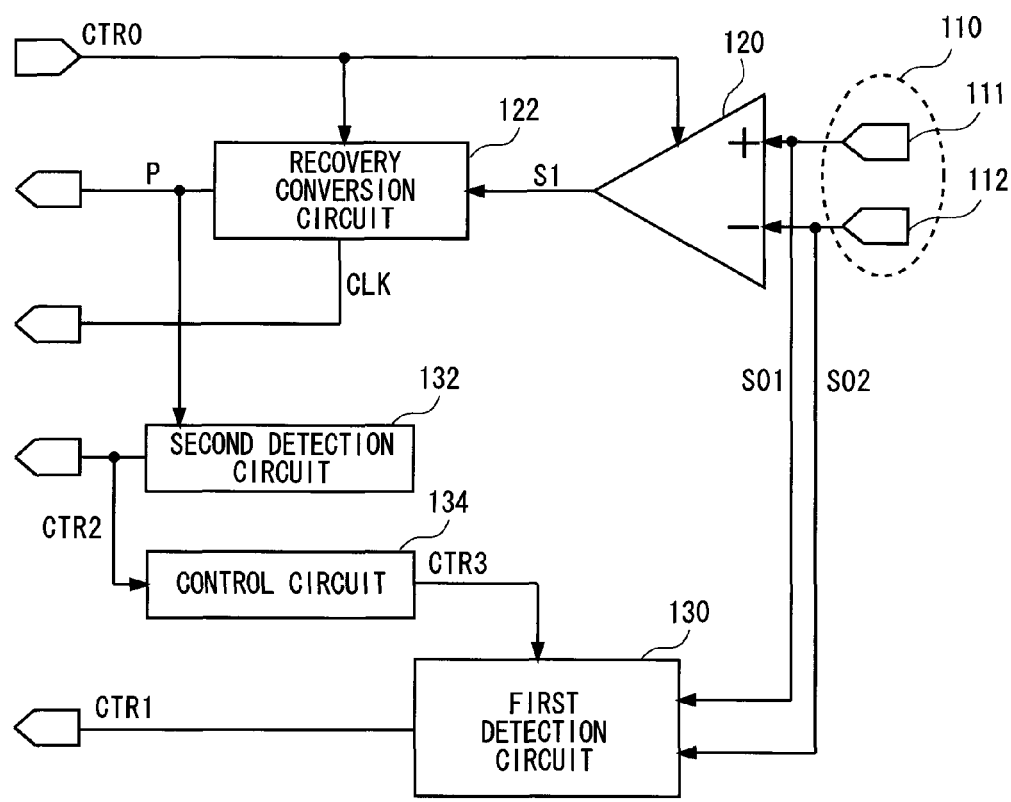
FIG. 1 is a diagram showing a physical layer circuit according to a first exemplary embodiment of the present invention.

FIG. 1 shows a physical layer circuit 100 according to a first exemplary embodiment of the present invention. The physical layer circuit 100 is a physical layer of a receiver of a differential serial communication device. The physical layer circuit 100 includes a differential input terminal 110, a receiver circuit 120, a recovery conversion circuit 122, a first detection circuit 130, a second detection circuit 132, and a control circuit 134. The differential input terminal 110 is composed of a positive polarity terminal 111 and a negative polarity terminal 112.

Each of the positive polarity terminal 111 and the negative polarity terminal 112 is connected to a serial cable, receives a differential serial signal transmitted from a communication counterpart, and outputs the received signal to the receiver circuit 120 and the recovery conversion circuit 122. A positive polarity input S01 and a negative polarity input S02 are input from the positive polarity terminal 111 and the negative polarity terminal 112, respectively.

Figure 11:
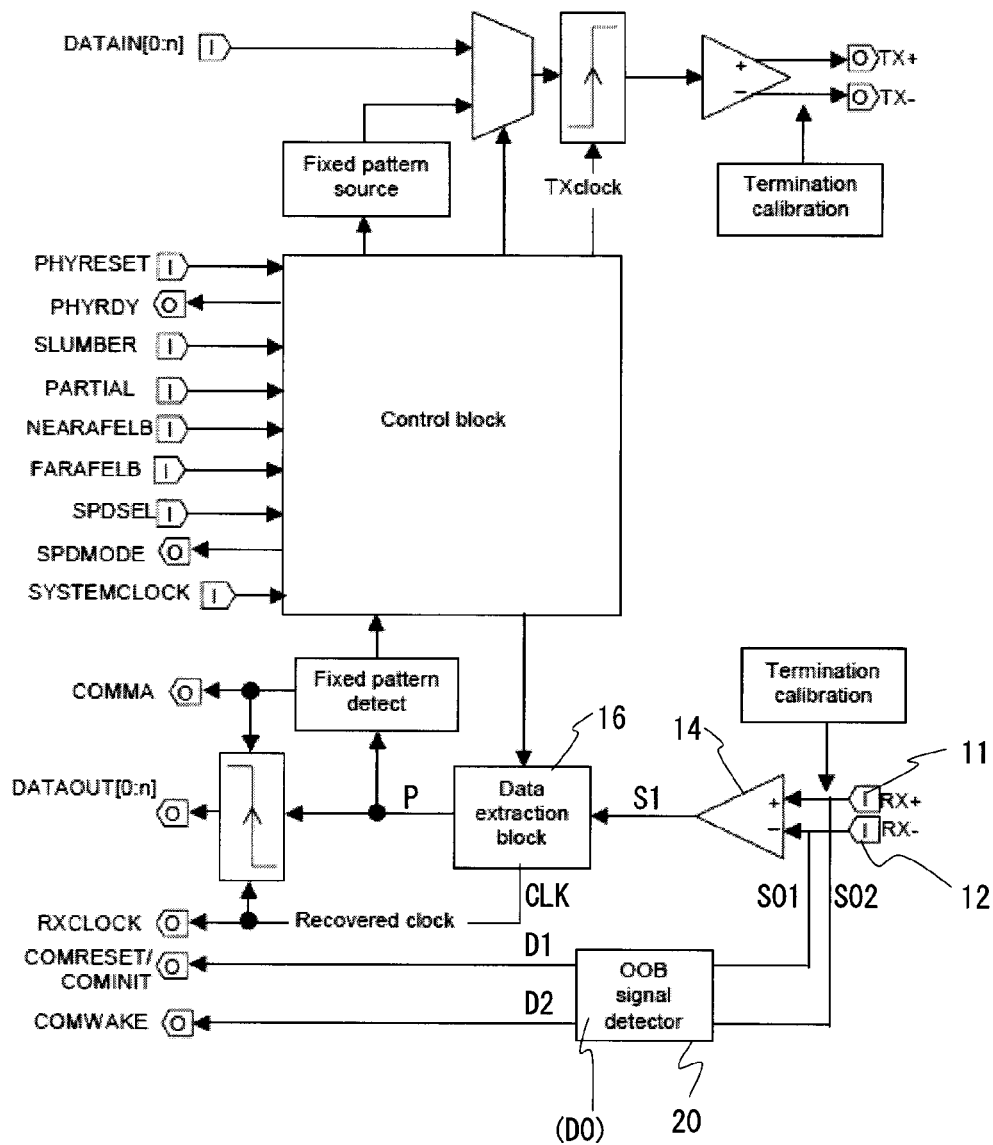
FIG. 11 is a diagram shown a physical layer circuit of a typical serial communication device.
Figure 12:
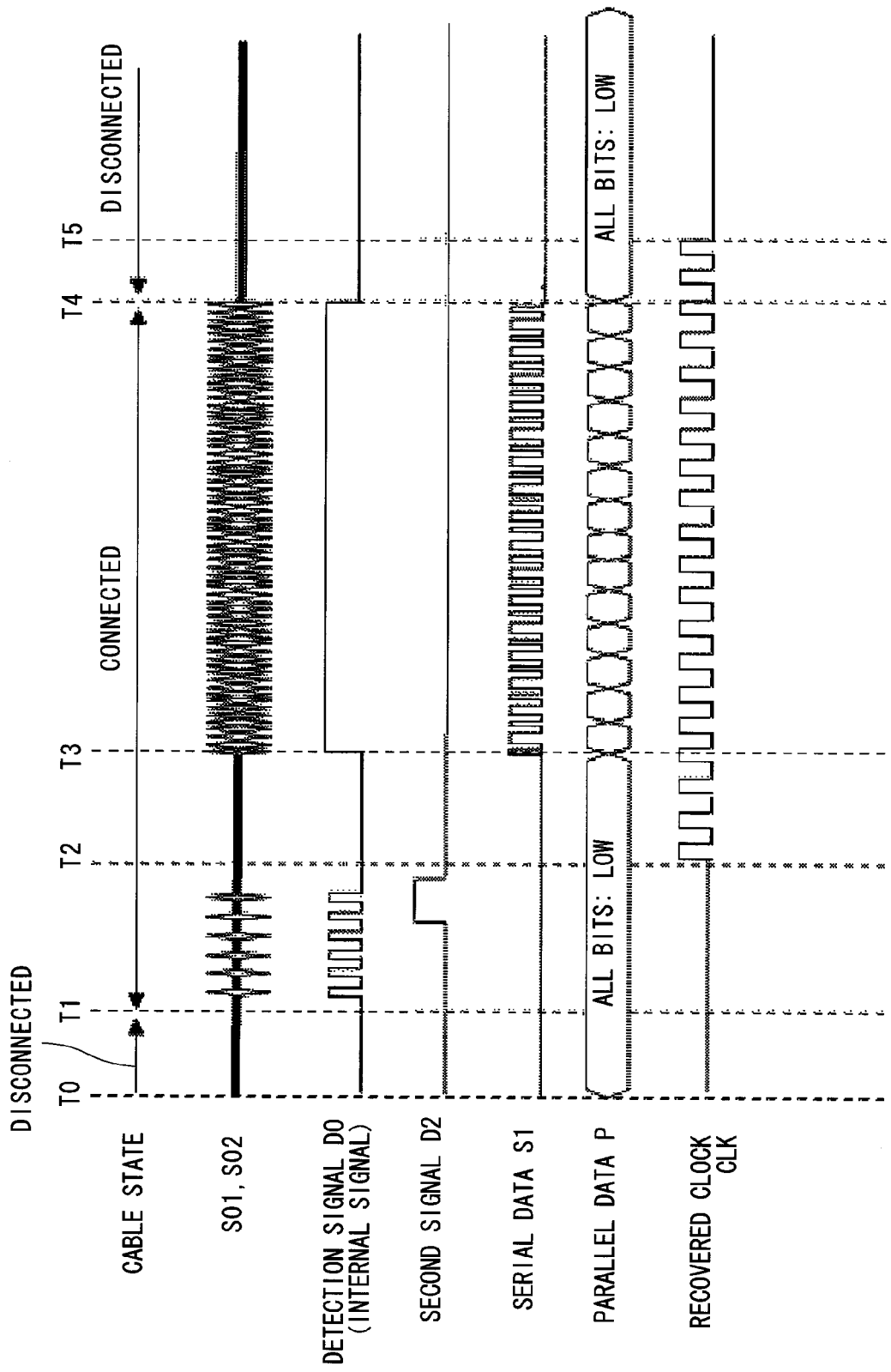
FIG. 12 is a timing diagram showing an exemplary transition of each signal in the physical layer circuit shown in FIG. 11.

The receiver circuit 120 is an analog differential comparator circuit similar to the receiver circuit 14 shown in FIG. 11. The receiver circuit 120 converts an input from the differential input terminal 110 into a single serial data item S1, and outputs the serial data to the recovery conversion circuit 122. When the differential input terminal 110 receives no differential serial signal, i.e., when the positive polarity input S01 and the negative polarity input S02 are at the same potential, the receiver circuit 120 outputs a low level signal as the serial data S1. Meanwhile, when the differential input terminal 110 receives a differential serial signal, the receiver circuit 120 outputs a high level signal or a low level signal that corresponds to the level of the positive polarity input S01, as the serial data S1.

The recovery conversion circuit 122 is a circuit similar to the recovery conversion circuit 16 shown in FIG. 11. The recovery conversion circuit 122 separates a clock signal from the serial data S1 to obtain a received recovered clock CLK, and converts the serial data S1 into a predetermined number of bits (bit width) of parallel data P.

In short, the receiver circuit 120 and the recovery conversion circuit 122 function as "a conversion unit" as defined in the claims. Further, the receiver circuit 120 and the recovery conversion circuit 122 receive a power supply control signal CTR0 from an upper layer, and ON/OFF of the power supply thereof is controlled by the power supply control signal CTR0.

The positive polarity input S01 and the negative polarity input S02 are also output to the first detection circuit 130. Like the detection circuit 20 shown in FIG. 11, the first detection circuit 130 includes an analog differential comparator circuit. The differential comparator circuit compares the amplitudes of the positive polarity input S01 and the negative polarity input S02 with a predetermined threshold, and detects, from the positive polarity input S01 and the negative polarity input S02, a connection recognition signal which is transmitted prior to the start of data transmission by the communication counterpart. Upon detecting the connection recognition signal, the first detection circuit 130 outputs a first control signal CTR1 of high level to the upper layer.

The first detection circuit 130, which compares the amplitudes of the positive polarity input S01 and the negative polarity input S02 with the predetermined threshold and obtains a comparison result, has a detection signal (not shown) indicative of the comparison result as an internal signal. Like the detection signal D0 obtained by the detection circuit 20 shown in FIG. 11, the high level of the detection signal indicates "input present state" and the low level thereof indicates "input absent state".

The second detection circuit 132 is connected to the recovery conversion circuit 122, and receives the parallel data P from the recovery conversion circuit 122. The second detection circuit 132 detects the presence or absence of the differential serial signal input to the differential input terminal 110 based on the bit configuration of the parallel data P. Upon detecting the absence of the differential serial signal input to the differential input terminal 110, the second detection circuit 132 outputs a second control signal CTR2 for allowing the upper layer to output the power supply control signal CTR0 for turning off the power supply of each of the receiver circuit 120 and the recovery conversion circuit 122. The detailed configuration of the second detection circuit 132 will be described in detail later.

The second control signal CTR2 is also output to the control circuit 134. The control circuit 134 outputs a third control signal CTR3 for turning on or off the power supply of the first detection circuit 130 to the first detection circuit 130 according to the second control signal CTR2.

Figure 2:
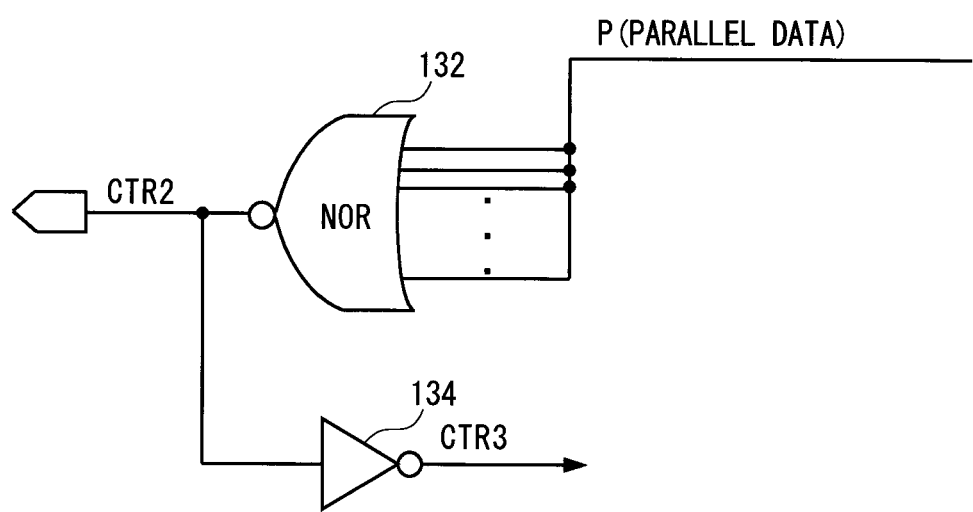
FIG. 2 is a diagram showing a second detection circuit and a control circuit which are provided in the physical layer circuit shown in FIG. 1.

FIG. 2 shows the second detection circuit 132 and the control circuit 134 in the physical layer circuit 100 shown in FIG. 1. As shown in FIG. 2, in the first exemplary embodiment, the second detection circuit 132 is a NOR gate that receives the parallel data P and outputs a logical NOR of the bits of the parallel data P as the second control signal CTR2. For instance, when the parallel data P is 8-bit data, the parallel data P is input to the second detection circuit 132 every eight bits. Only when all the eight bits of the parallel data P are at low level, the second control signal CTR2 becomes high level.

The control circuit 134 is an inverter that receives the second control signal CTR2 and outputs an inverted signal of the second control signal CTR2 as the third control signal CTR3 to the first detection circuit 130. Only when all the bits of the parallel data P are at low level, the second control signal CTR2 becomes high level. Accordingly, the third control signal CTR3 becomes low level only when all the bits of the parallel data P are at low level.

Figure 3:
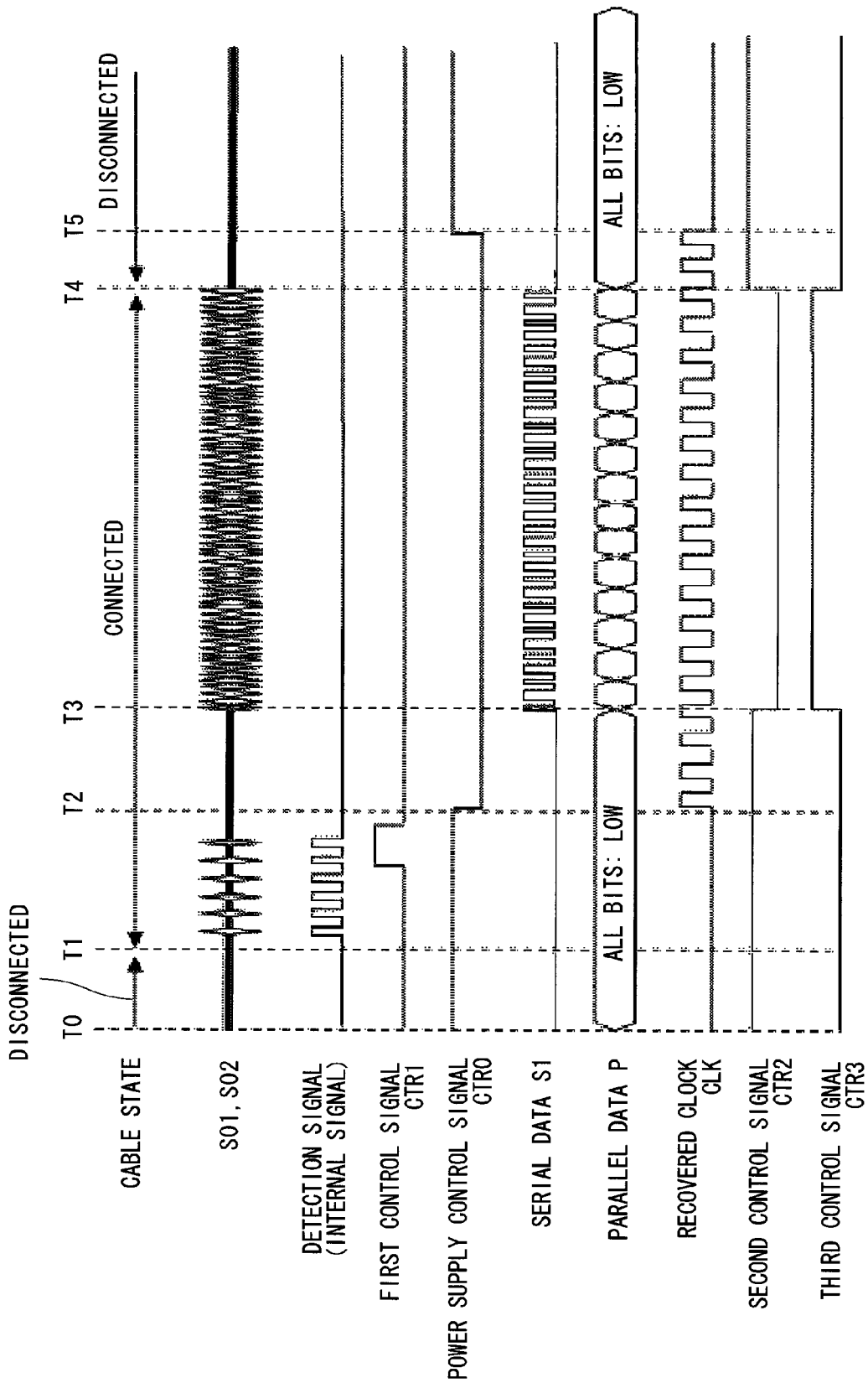
FIG. 3 is a timing diagram showing an exemplary transition of each signal in the physical layer circuit shown in FIG. 1.

FIG. 3 is a timing diagram showing an exemplary transition of each signal in the physical layer circuit 100 shown in FIG. 1. The transition is described in time sequence.

Time T0

The serial cable connected to the differential input terminal is in a disconnected state. At this time, the power supply control signal CTR0 from the upper layer is at high level, and the power supply of each of the receiver circuit 120 and the recovery conversion circuit 122 is turned off. Further, the positive polarity input S01 and the negative polarity input S02 are at the same potential, and the detection signal serving as the internal signal of the first detection circuit 130, the first control signal CTR1, the serial data S1, all the bits of the parallel data P, and the recovered clock CLK are at low level.

Since all the bits of the parallel data P are at low level, the second control signal CTR2 is at high level and the third control signal CTR3 is at low level.

Time T1

The serial cable is connected and the connection recognition signal is input to the differential input terminal 110. Thus, the first detection circuit 130 outputs the first control signal CTR1 of high level to the upper layer. The power supply of each of the receiver circuit 120 and the recovery conversion circuit 122 remains turned off. Accordingly, the serial data S1, all the bits of the parallel data P, and the recovered clock CLK remain at low level, the second control signal CTR2 remains at high level, and the third control signal CTR3 remains at low level.

Time T2

The upper layer receiving the first control signal CTR1 of high level changes the power supply control signal CTR0 to the low level, and turns on the power supply of each of the receiver circuit 120 and the recovery conversion circuit 122. In response to this, the receiver circuit 120 and the recovery conversion circuit 122 start to operate, and the output of the recovered clock CLK is started. Since a data signal subsequent to the connection recognition signal is not input yet, the serial data S1 and all the bits of the parallel data P are at low level. Accordingly, the second control signal CTR2 remains at high level and the third control signal CTR3 remains at low level. Further, no recognition connection signal is detected, so that the first control signal CTR1 becomes low level.

Time T3

The differential input terminal 110 receives a normal data signal subsequent to the connection recognition signal. This data signal is converted into the serial data S1 by the receiver circuit 120, and is further converted into the parallel data P by the recovery conversion circuit 122. The recovered clock CLK synchronous with the parallel data P is also output. Since these data signals are not recognition connection signals, the first control signal CTR1 remains at low level.

The data signal input to the differential input terminal 110 is encoded using 8B10B. The serial data S1 obtained by converting the data signal constantly changes between the low level and the high level. Therefore, in the parallel data P obtained by further converting the serial data S1, the numbers of all the bits at the high level and at the low level per bit width are averaged. For this reason, it is impossible that all the bits become low level. Thus, the second control signal CTR2 becomes low level, and the third control signal CTR3 becomes high level.

When the third control signal CTR3 becomes high level, the power supply of the first detection circuit 130 is turned off.

Time T4

No data signal is input, and the serial cable is disconnected. Thus, the positive polarity input S01 and the negative polarity input S02 are at the same potential, and the serial data S1 and all the bits of the parallel data P become low level.

When all the bits of the parallel data P become low level, the second control signal CTR2 becomes high level and the third control signal CTR3 becomes low level. When the third control signal CTR3 becomes low level, the first detection circuit 130 is turned on and resumes the operation.

Time T5

Upon receiving the second control signal CTR2 of high level, the upper layer changes the power supply control signal CTR0 to the high level, thereby turning off the power supply of each of the receiver circuit 120 and the recovery conversion circuit 122. As a result, no recovered clock CLK is output.

In this manner, when the first detection circuit 130 detects the connection recognition signal, the power supply of each of the receiver circuit 120 and the recovery conversion circuit 122 is turned on, so that the physical layer circuit 100 according to the first exemplary embodiment can receive data subsequent to the connection recognition signal. Further, when the second detection circuit 132 detects the input absent state, the power supply of each of the receiver circuit 120 and the recovery conversion circuit 122 is turned off, thereby achieving a squelch function. This function is similar to that of the physical layer circuit shown in FIG. 11.

Furthermore, in the physical layer circuit 100 according to the first exemplary embodiment, the second detection circuit 132 detects the input present state or the input absent state after the detection of the connection recognition signal. When the input present state is detected, the power supply of the first detection circuit 130 is turned off, and when the input absent state is detected, the power supply of the first detection circuit 130 is turned on. Thus, during the period in which normal data communication is performed (e.g., the period from the time T3 to the time T4 shown in FIG. 3), the power supply of the first detection circuit 130 is turned off, thereby making it possible to reduce the power consumption of the first detection circuit 130.

The physical layer circuit 100 of this exemplary embodiment has a configuration in which the second detection circuit 132 and the control circuit 134 are added to the physical layer circuit shown in FIG. 11. Yet, the second detection circuit 132 and the control circuit 134 are logic gates each composed of a CMOS circuit, and the power consumption of the physical circuit 100 is much less than that of the first detection circuit 130 including an analog comparator, even when the physical layer circuit 100 operates in the state where the normal data communication is performed.

For instance, in an actual measurement, the power consumption of the first detection circuit 130 during operation is 10 mW, whereas the power consumption of each of the second detection circuit 132 and the control circuit 134 during operation is about 10 μW.

Moreover, when the serial cable is disconnected, the receiver circuit 120 and the recovery conversion circuit 122 are suspended, and the parallel data P, which is the input of the second detection circuit 132, does not change. Accordingly, the power consumption of the second detection circuit 132 and the control circuit 134, each of which is composed of a CMOS circuit, is 0 µW. Thus, the power consumption when the serial capable is disconnected is not increased as compared with the physical layer circuit shown in FIG. 11.

Second Exemplary Embodiment

Figure 4:
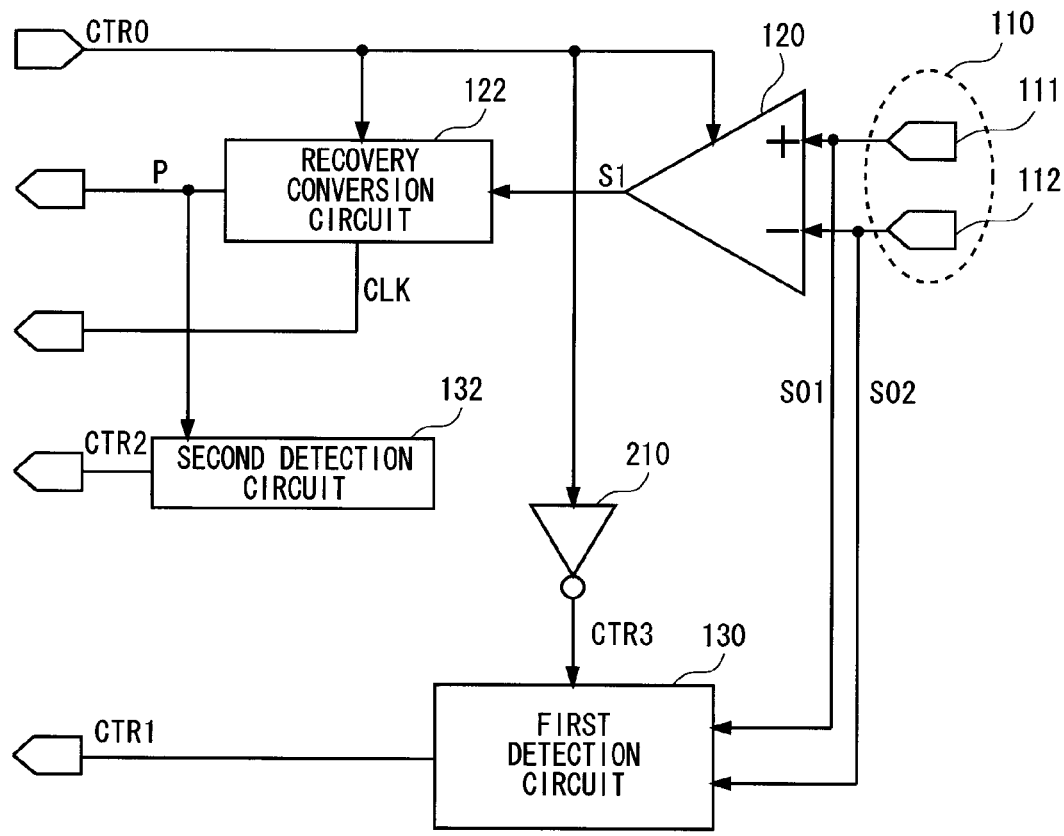
FIG. 4 is a diagram showing a physical layer circuit according to a second exemplary embodiment of the present invention.

FIG. 4 shows a physical layer circuit 200 according to a second exemplary embodiment of the present invention. The physical layer circuit 200 has a configuration similar to that of the physical layer circuit 100 except that a control circuit 210 is provided in place of the control circuit 134 of the physical layer circuit 100. Accordingly, only the control circuit 210 is described in the second exemplary embodiment. The other functional blocks are denoted by the same reference numerals used in FIG. 1, and the description thereof is omitted.

The control circuit 210 is an inverter that receives the power supply control signal CTR0 from the upper layer, and outputs an inverted signal of the power supply control signal CTR0 as the third control signal CTR3 to the first detection circuit 130.

Figure 5:
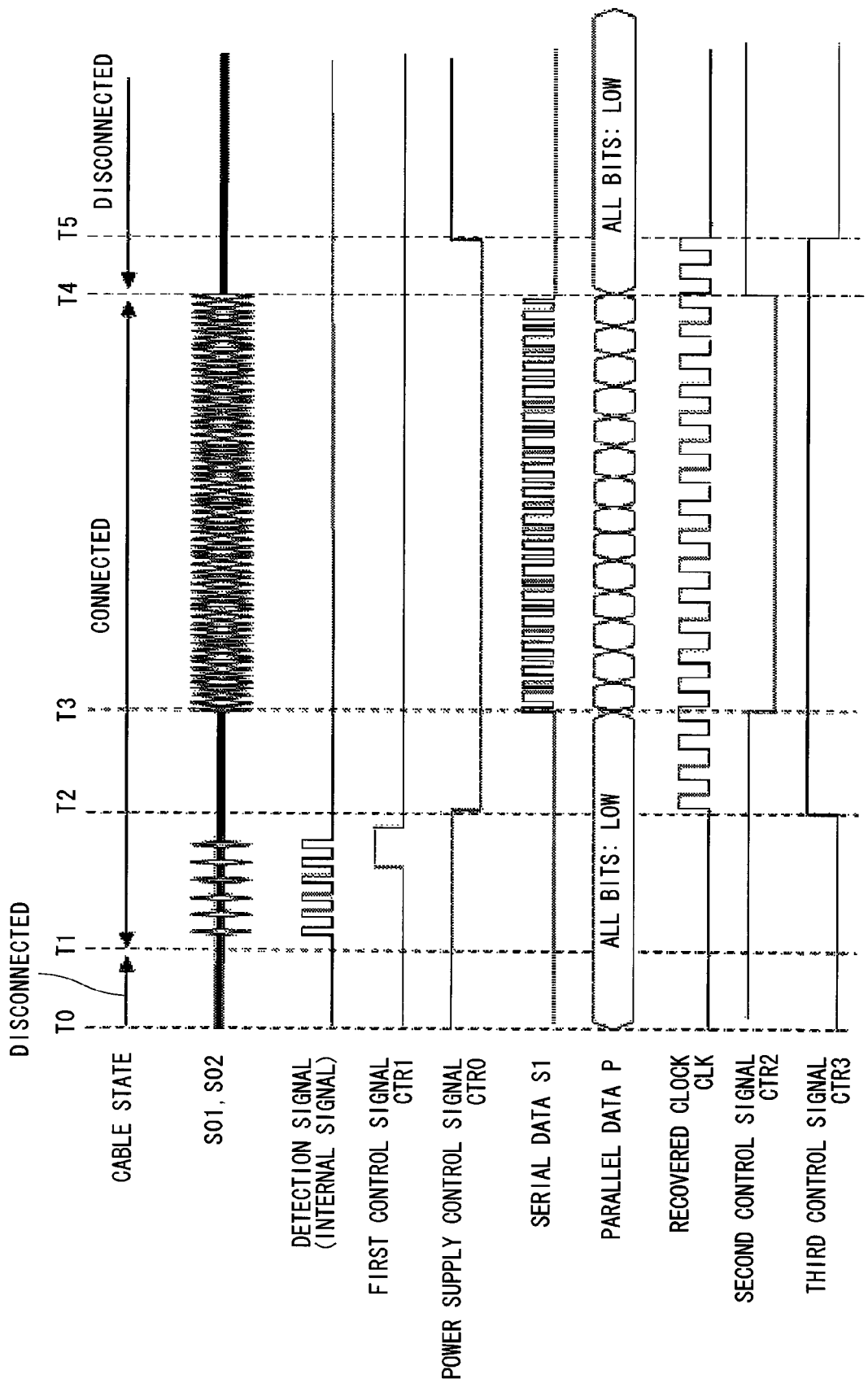
FIG. 5 is a timing diagram showing an exemplary transition of each signal in the physical layer circuit shown in FIG. 4.

FIG. 5 is a timing diagram showing an exemplary transition of each signal in the physical layer circuit 200 shown in FIG. 4. The transition is described in time sequence.

Time T0

The serial cable connected to the differential input terminal is in a disconnected state. At this time, the power supply control signal CTR0 from the upper layer is at high level, and the power supply of each of the receiver circuit 120 and the recovery conversion circuit 122 is turned off. Accordingly, the third control signal CTR3 is at low level. Further, the positive polarity input S01 and the negative polarity input S02 are at the same potential, and the detection signal serving as the internal signal of the first detection circuit 130, the first control signal CTR1, the serial data S1, all the bits of the parallel data P, and the recovered clock CLK are at low level.

Since all the bits of the parallel data P are at low level, the second control signal CTR2 is at high level.

Time T1

The serial cable is connected and the connection recognition signal is input to the differential input terminal 110. Thus, the first detection circuit 130 outputs the first control signal CTR1 of high level to the upper layer. The power supply of each of the receiver circuit 120 and the recovery conversion circuit 122 remains turned off. Accordingly, the serial data S1, all the bits of the parallel data P, and the recovered clock CLK remain at low level, the second control signal CTR2 remains at high level, and the third control signal CTR3 remains at low level.

Time T2

The upper layer receiving the first control signal CTR1 of high level changes the power supply control signal CTR0 to the low level, and turns on the power supply of each of the receiver circuit 120 and the recovery conversion circuit 122. In response to this, the receiver circuit 120 and the recovery conversion circuit 122 start to operate, and the output of the recovered clock CLK is started. Since the power supply control signal CTR0 becomes low level, the third control signal CTR3 becomes high level. As a result, the power supply of the first detection circuit 130 is turned off.

Since a data signal subsequent to the connection recognition signal is not input yet, the serial data S1 and all the bits of the parallel data P are at low level. Accordingly, the second control signal CTR2 remains at high level. Further, no recognition connection signal is detected, so that the first control signal CTR1 becomes low level.

Time T3

The data signal input to the differential input terminal 110 is encoded using 8B10B. The serial data S1 obtained by converting the data signal constantly changes between the low level and the high level. Therefore, in the parallel data P obtained by further converting the serial data S1, the numbers of all the bits at the high level and at the low level per bit width are averaged. For this reason, it is impossible that all the bits become low level. Thus, the second control signal CTR2 becomes low level.

The data signal input to the differential input terminal 110 is encoded using 8B10B. The serial data S1 obtained by converting the data signal constantly changes between the low level and the high level. Therefore, in the parallel data P obtained by converting the serial data S1, the numbers of all the bits at the high level and at the low level per bit width are averaged. For this reason, it is impossible that all the bits become low level. As a result, the second control signal CTR2 becomes low level.

Time T4

No data signal is input, and the serial cable is disconnected. Thus, the positive polarity input S01 and the negative polarity input S02 are at the same potential, and the serial data S1 and all the bits of the parallel data P become low level.

When all the bits of the parallel data P become low level, the second control signal CTR2 becomes high level.

Time T5

Upon receiving the second control signal CTR2 of high level, the upper layer changes the power supply control signal CTR0 to the high level, thereby turning off the power supply of each of the receiver circuit 120 and the recovery conversion circuit 122. As a result, no recovered clock CLK is output.

Additionally, when the power supply control signal CTR0 becomes high level, the third control signal CTR3 becomes low level. As a result, the first detection circuit 130 is turned on and starts to operate.

The physical layer circuit 200 of the second exemplary embodiment can obtain the same effects as those of the physical layer circuit 100. In the physical layer circuit 100, the period in which the power supply of the first detection circuit 130 is turned off corresponds to the period in which the normal data communication is performed (the period from the time T3 to the time T4 shown in FIGS. 3 and 5). Meanwhile, in the physical layer circuit 200, the period in which the power supply of the first detection circuit 130 is turned off corresponds to the period from the time when the upper layer recognizes connection (time T2 shown in FIGS. 3 and 5) to the time when the upper layer recognizes disconnection (time T5 shown in FIGS. 3 and 5). That is, the physical layer circuit 200 allows the power supply of the first detection circuit 130 to be turned off for a longer period of time, resulting in a reduction in power consumption of the physical layer circuit and the communication device.

Other Exemplary Embodiments

Hereinafter, other exemplary configurations of the second detection circuit 132 shown in FIG. 2, which is provided in the physical layer circuit, will be described as other exemplary embodiments of the present invention.

Figure 6:
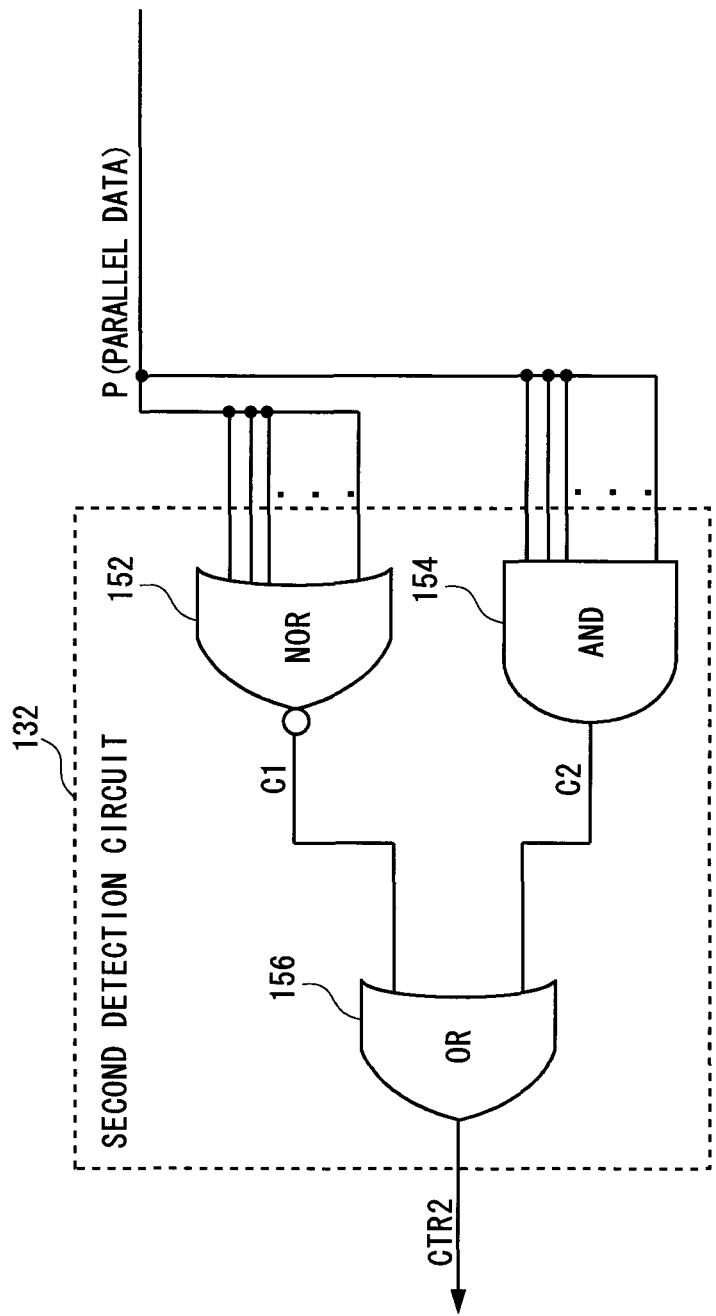
FIG. 6 shows a first exemplary configuration of the second detection circuit.

FIG. 6 shows a first exemplary configuration of the second detection circuit 132. The second detection circuit 132 includes a NOR gate 152, an AND gate 154, and an OR gate 156. The NOR gate 152 receives each bit of the parallel data P. The AND gate 154 also receives each bit of the parallel data P. The OR gate 156 receives outputs of the NOR gate 152 and the AND gate 154.

The NOR gate 152 outputs a signal C1 of high level only when all the bits of the parallel data P are at low level. The AND gate 154 outputs a signal C2 of high level only when all the bits of the parallel data P are at high level. The OR gate 156 outputs a high level signal when one or both of the signals C1 and C2 are at high level. The OR gate 156 outputs the second control signal CTR2.

That is, according to the second detection circuit 132 shown in FIG. 6, the second control signal CTR2 becomes high level when all the bits of the parallel data P are at low level and when all the bits of the parallel data P are at high level. In the other cases, the second control signal CTR2 becomes low level.

As described above, it is impossible that all the bits of the parallel data P become low level during the normal data communication. It is also impossible that all the bits of the parallel data P become high level. Not only the period in which all the bits of the parallel data P are at low level, but also the period in which all the bits of the parallel data P are at high level is detected as a period other than the period in which the normal data communication is performed. This improves the detection accuracy.

Figure 7:
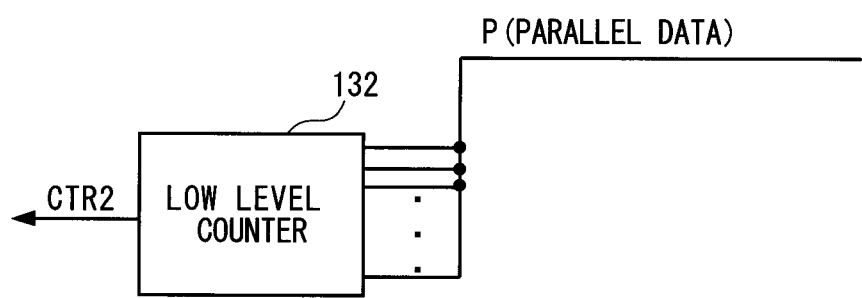
FIG. 7 shows a second exemplary configuration of the second detection circuit.

FIG. 7 shows a second exemplary configuration of the second detection circuit 132. The second detection circuit 132 is a low level counter that counts the number of low-level bits of the parallel data P. The low level counter 132 outputs a high level signal when a ratio of low-level bits to all the bits of the parallel data P is equal to or greater than a predetermined threshold, and outputs a low level signal in other cases. The low level counter 132 outputs the second control signal CTR2.

As described above, during the normal data communication, the numbers of all the bits at the high level and at the low level of the parallel data P are averaged. For this reason, it is possible to detect that the normal data communication is not performed, by detecting that all the bits of the parallel data P are at low level. However, when the normal data communication is not performed due to generation of noise inside or outside an LSI, there is a possibility that not all the bits of the parallel data P become low level. Therefore, when the second detection circuit 132 is composed of the low level counter shown in FIG. 7, the resistance to noise can be improved.

The threshold indicating that the low level counter 132 outputs a high level signal or a low level signal is defined as a parameter so as to be varied. This makes it possible to adjust the amount of resistance to noise.

Figure 8:
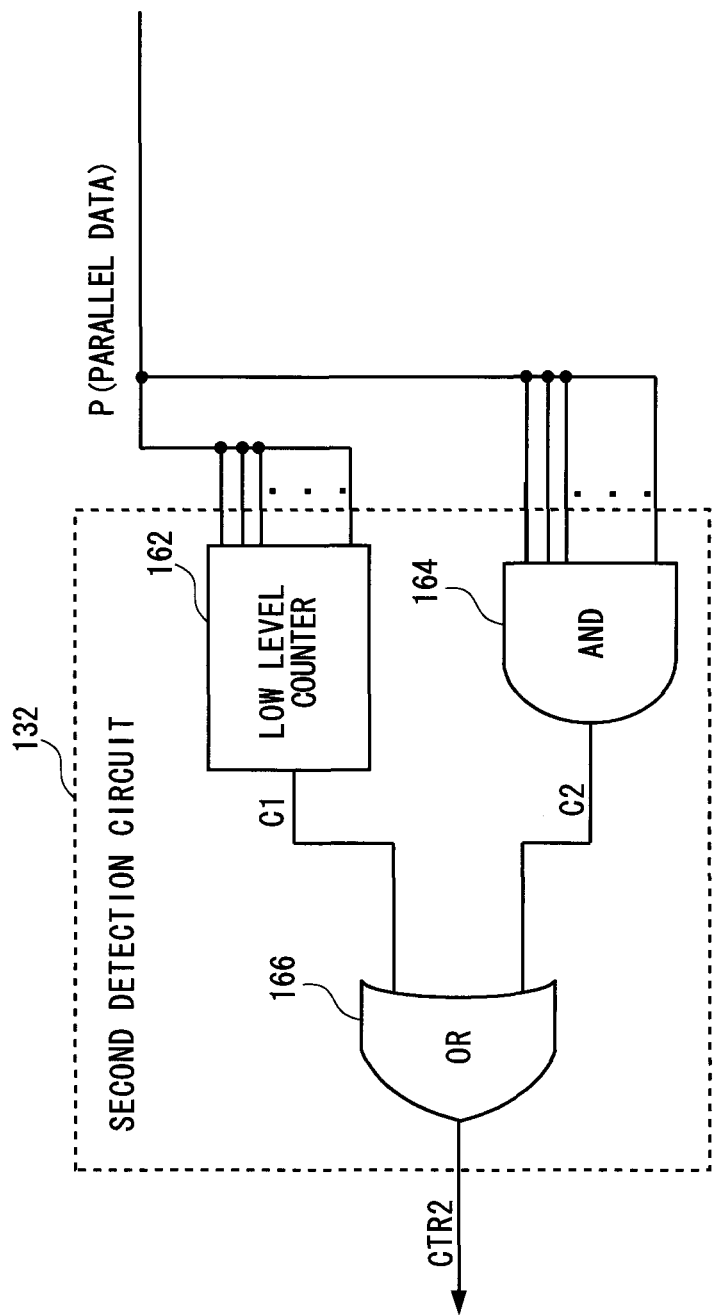
FIG. 8 shows a third exemplary configuration of the second detection circuit.

FIG. 8 shows a third exemplary configuration of the second detection circuit 132. The second detection circuit 132 includes a low level counter 162, an AND gate 164, and an OR gate 166. The low level counter 162 receives each bit of the parallel data P. The AND gate 164 also receives each bit of the parallel data P. The OR gate 166 receives outputs of the low level counter 162 and the AND gate 164.

Like the low level counter 132 shown in FIG. 7, the low level counter 162 outputs a high level signal when the ratio of low-level bits to all the bits of the parallel data P is equal to or greater than the predetermined threshold, and outputs a low level signal in other cases. The signal C1 output by the low level counter 162 is input to the OR gate 166.

The AND gate 164 outputs the signal C2 of high level only when all the bits of the parallel data P are at high level. The OR gate 166 outputs a high level signal when one or both of the signals C1 and C2 are at high level. The OR gate 166 outputs the second control signal CTR2.

Like the second detection circuit composed of the low level counter 132 shown in FIG. 7, the second detection circuit 132 shown in FIG. 8 can improve the resistance to noise. Furthermore, the period in which all the bits of the parallel data P are at high level is also detected as a period other than the period in which the normal data communication is performed, thereby increasing the detection accuracy.

Figure 9:
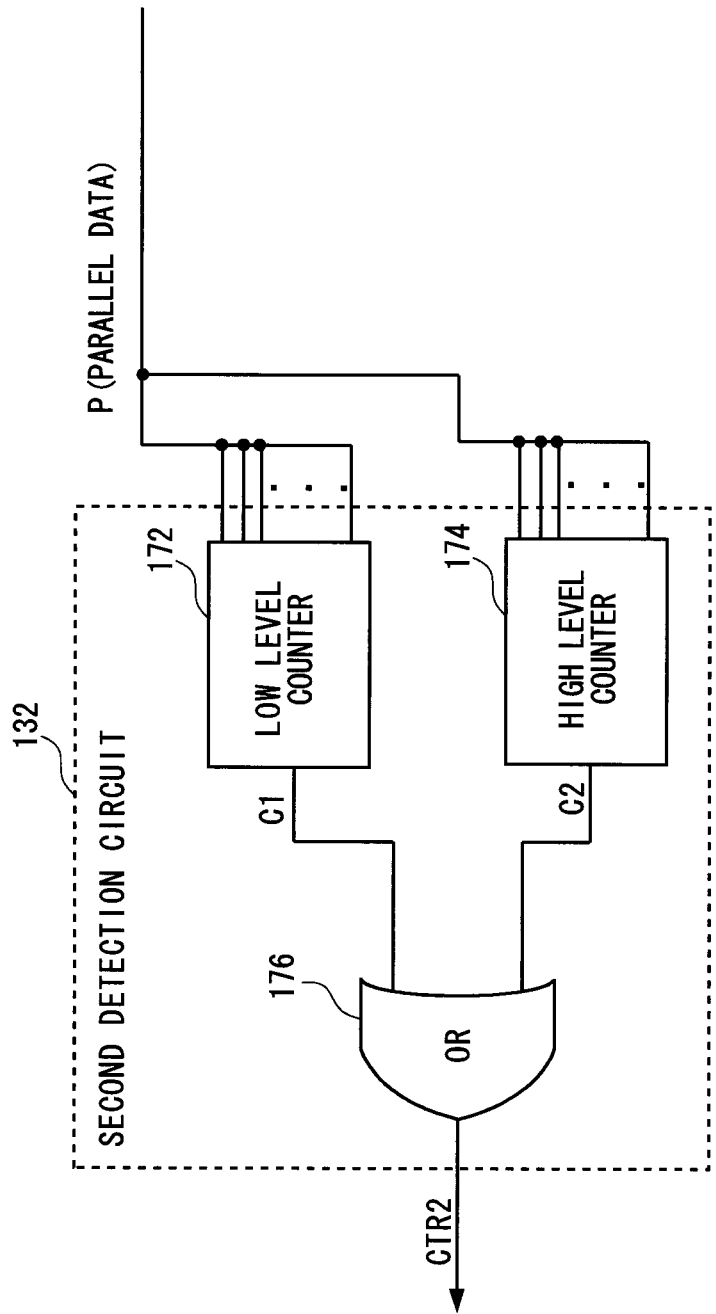
FIG. 9 shows a fourth exemplary configuration of the second detection circuit.

FIG. 9 shows a fourth exemplary configuration of the second detection circuit 132. The second detection circuit 132 includes a low level counter 172, a high level counter 174, and an OR gate 176.

Like the low level counter 132 shown in FIG. 7, the low level counter 172 outputs a high level signal when the ratio of low-level bits to all the bits of the parallel data P is equal to or greater than the predetermined threshold, and outputs a high level signal in other cases. The signal C1 output by the low level counter 172 is input to the OR gate 176.

The high level counter 174 is a counter that counts the number of high-level bits of the parallel data P. The high level counter 174 outputs a high level signal as the signal C2 when the ratio of high-level bits to all the bits of the parallel data P is equal to or greater than the predetermined threshold, and outputs a low level signal as the signal C2 in other cases.

The OR gate 176 receives the signals C1 and C2 and outputs a logical OR between the signals as the second control signal CTR2.

As described above, during the normal data communication, the numbers of all the bits at the high level and at the low level of the parallel data P are averaged. For this reason, it is possible to detect that the normal data communication is not performed, by detecting that all the bits of the parallel data P are at low level. However, when the normal data communication is not performed due to generation of noise inside or outside an LSI, there is a possibility that not all the bits of the parallel data P become low level. Therefore, when the second detection circuit 132 is composed of the low level counter shown in FIG. 7, the resistance to noise can be improved.

In the second detection circuit 132 shown in FIG. 9, the period in which the ratio of high-level bits, which are counted by the low level counter 172 as well as the high level counter 174, to all the bits of the parallel data is detected as a period other than the period in which the normal data communication is performed. This improves the detection accuracy.

Figure 10:
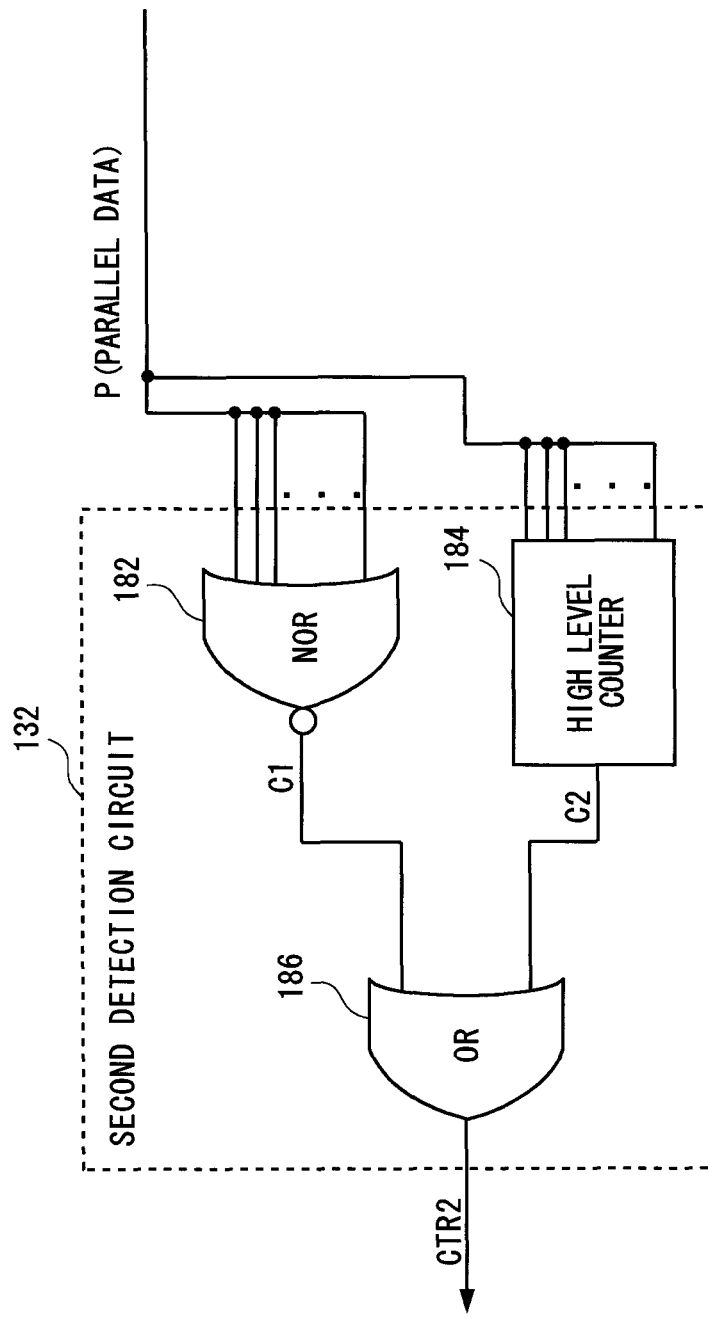
FIG. 10 shows a fifth exemplary configuration of the second detection circuit.

FIG. 10 shows a fifth exemplary configuration of the second detection circuit 132. The second detection circuit 132 includes a NOR gate 182, a high level counter 184, and an OR gate 186.

The NOR gate 182 receives each bit of the parallel data P and outputs a high level signal as the signal C1 only when all the bits of the parallel data P are at low level.

The high level counter 184 is a counter that counts the number of high-level bits of the parallel data P. The high level counter 184 outputs a high level signal as the signal C2 when the ratio of the high-level bits to all the bits of the parallel data P is equal to or greater than the predetermined threshold, and outputs a low level signal in other cases.

The OR gate 186 receives the signals C1 and C2 and outputs a logical OR between the signals as the second control signal CTR2. The second detection circuit 132 shown in FIG. 10 is a combination of the NOR gate constituting the second detection circuit 132 shown in FIG. 2, and the high level counter 174 constituting the second detection circuit 132 shown in FIG. 9. The description of effects of the second detection circuit 132 shown in FIG. 10 is herein omitted.

While the invention has been described in terms of several exemplary embodiments, those skilled in the art will recognize that the invention can be practiced with various modifications within the spirit and scope of the appended claims and the invention is not limited to the examples described above.

Further, the above exemplary embodiments can be combined as desirable by one of ordinary skill in the art.

Further, the scope of the claims is not limited by the exemplary embodiments described above.

Furthermore, it is noted that, Applicant's intent is to encompass equivalents of all claim elements, even if amended later during prosecution.

What is claimed is:

1. A physical layer circuit of a differential serial communication device, comprising:
    a differential input terminal that receives a differential serial signal from a communication counterpart, and outputs the received differential serial signal;
    a conversion unit that is connected to the differential input terminal and converts an output from the differential input terminal into a predetermined number of bits of parallel data, ON/OFF of a power supply of the conversion unit being controlled by a power supply control signal from an upper layer;
    a first detection circuit that is connected to the differential input terminal and detects a connection recognition signal indicating a start of communication, from the output from the differential input terminal, the first detection circuit outputting a first control signal for allowing the upper layer to output the power supply control signal for turning on the power supply of the conversion unit, upon detecting the connection recognition signal;
    a second detection circuit that is connected to the conversion unit and detects presence or absence of reception of the differential serial signal at the differential input terminal by detecting whether the predetermined number of bits of the parallel data obtained by the conversion unit has a bit configuration indicative of the presence or absence of the reception of the differential serial signal at the differential input terminal, the second detection circuit outputting a second control signal for allowing the upper layer to output the power supply control signal for turning off the power supply of the conversion unit, upon detecting the absence of the reception; and
    a control circuit that turns off a power supply of the first detection circuit when the second detection circuit detects the presence of the reception, and turns on the power supply of the first detection circuit when the second detection circuit detects the absence of the reception.

2. The physical layer circuit according to claim 1, wherein the second detection circuit and the control circuit are each composed of a CMOS circuit.

3. The physical layer circuit according to claim 1, wherein the second detection circuit activates the second control signal when a ratio of low-level bits to all the predetermined number of bits of the parallel data obtained by the conversion unit is equal to or greater than a predetermined threshold, and
    the second detection circuit deactivates the second control signal in other cases.

4. The physical layer circuit according to claim 2, wherein the second detection circuit activates the second control signal when a ratio of low-level bits to all the predetermined number of bits of the parallel data obtained by the conversion unit is equal to or greater than a predetermined threshold, and
    the second detection signal deactivates the second control signal in other cases.

5. The physical layer circuit according to claim 3, wherein the second detection circuit activates the second control signal when all the predetermined number of bits of the parallel data obtained by the conversion unit are at low level.

6. The physical layer circuit according to claim 4, wherein the second detection circuit activates the second control signal when all the predetermined number of bits of the parallel data obtained by the conversion unit are at low level.

7. The physical layer circuit according to claim 3, wherein the second detection circuit further activates the second control signal when a ratio of high-level bits to all the predetermined number of bits of the parallel data obtained by the conversion unit is equal to or greater than a predetermined threshold.

8. The physical layer circuit according to claim 4, wherein the second detection circuit further activates the second control signal when a ratio of high-level bits to all the predetermined number of bits of the parallel data obtained by the conversion unit is equal to or greater than a predetermined threshold.

9. The physical layer circuit according to claim 5, wherein the second detection circuit further activates the second control signal when a ratio of high-level bits to all the predetermined number of bits of the parallel data obtained by the conversion unit is equal to or greater than a predetermined threshold.

10. The physical layer circuit according to claim 6, wherein the second detection circuit further activates the second control signal when a ratio of high-level bits to all the predetermined number of bits of the parallel data obtained by the conversion unit is equal to or greater than a predetermined threshold.

11. The physical layer circuit according to claim 3, wherein the second detection circuit further activates the second control signal when all the predetermined number of bits of the parallel data obtained by the conversion unit are at high level.

12. The physical layer circuit according to claim 4, wherein the second detection circuit further activates the second control signal when all the predetermined number of bits of the parallel data obtained by the conversion unit are at high level.

13. The physical layer circuit according to claim 5, wherein the second detection circuit further activates the second control signal when all the predetermined number of bits of the parallel data obtained by the conversion unit are at high level.

14. The physical layer circuit according to claim 6, wherein the second detection circuit further activates the second control signal when all the predetermined number of bits of the parallel data obtained by the conversion unit are at high level.

15. The physical layer circuit according to claim 3, wherein the control circuit receives the second control signal from the second detection circuit, and
    the control circuit turns on the power supply of the first detection circuit when the second control signal is activated, and turns off the power supply of the first detection circuit when the second control signal is deactivated.

16. The physical layer circuit according to claim 4, wherein
the control circuit receives the second control signal from the second detection circuit, and
the control circuit turns on the power supply of the first detection circuit when the second control signal is activated, and turns off the power supply of the first detection circuit when the second control signal is deactivated.

17. The physical layer circuit according to claim 5, wherein
the control circuit receives the second control signal from the second detection circuit, and
the control circuit turns on the power supply of the first detection circuit when the second control signal is activated, and turns off the power supply of the first detection circuit when the second control signal is deactivated.

18. The physical layer circuit according to claim 3, wherein
the control circuit receives the power supply control signal from the upper layer, and
the control circuit turns on the power supply of the first detection circuit when the power supply control signal is a signal for turning off the power supply of the conversion unit, and turns off the power supply of the first detection circuit when the power supply control signal is a signal for turning on the power supply of the conversion unit.

19. The physical layer circuit according to claim 4, wherein
the control circuit receives the power supply control signal from the upper layer, and
the control circuit turns on the power supply of the first detection circuit when the power supply control signal is a signal for turning off the power supply of the conversion unit, and turns off the power supply of the first detection circuit when the power supply control signal is a signal for turning on the power supply of the conversion unit.

20. The physical layer circuit according to claim 5, wherein
the control circuit receives the power supply control signal from the upper layer, and
the control circuit turns on the power supply of the first detection circuit when the power supply control signal is a signal for turning off the power supply of the conversion unit, and turns off the power supply of the first detection circuit when the power supply control signal is a signal for turning on the power supply of the conversion unit.

* * * * *